UNITED STATES PATENT OFFICE.

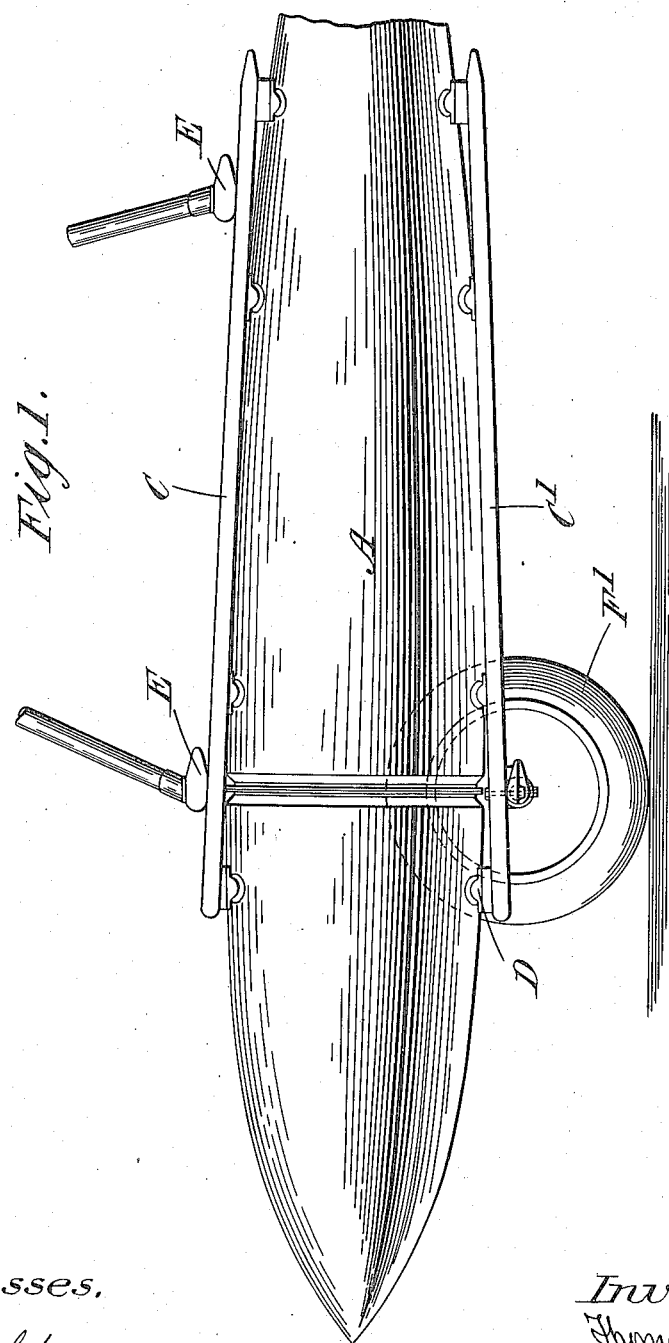

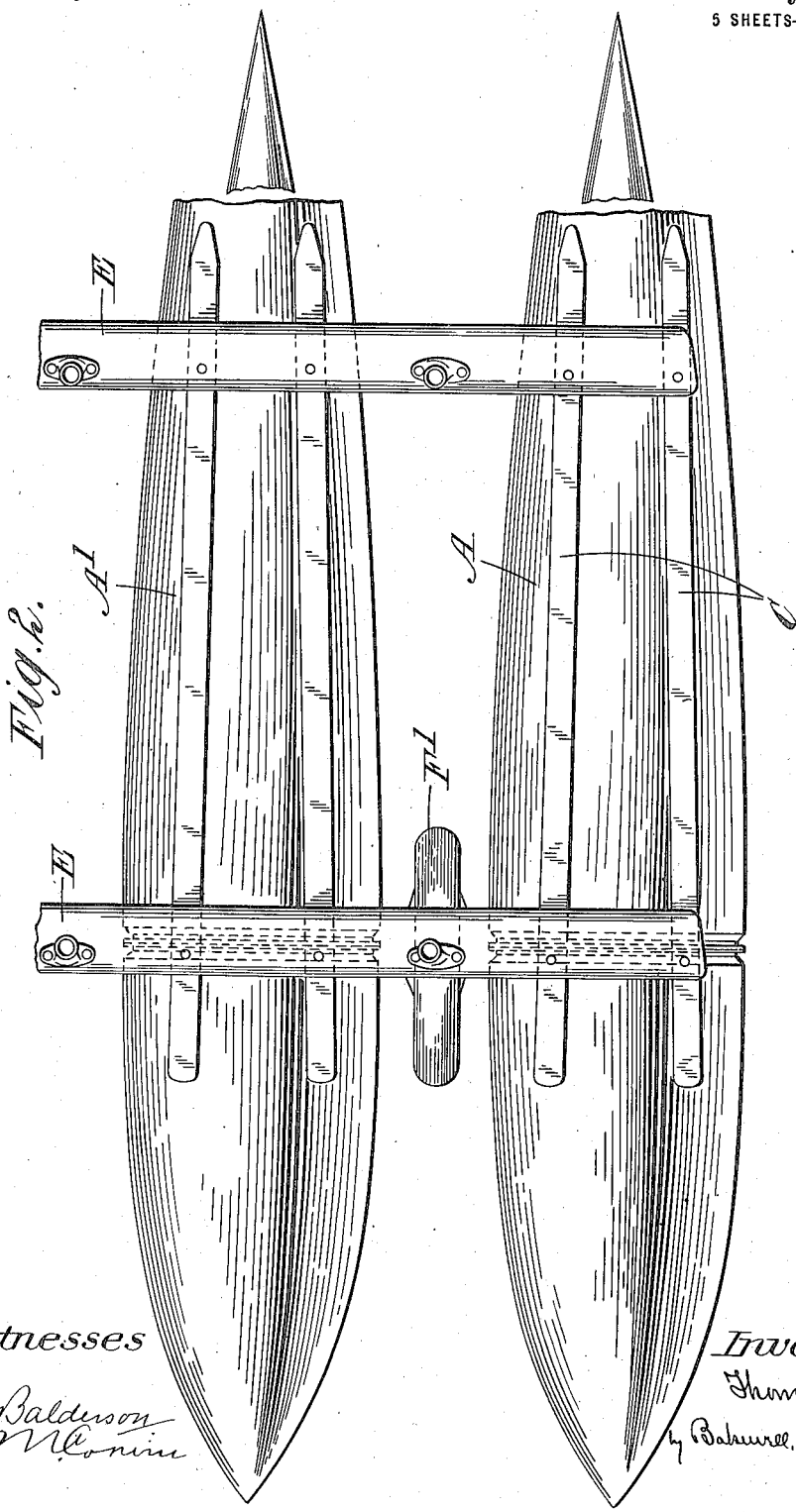

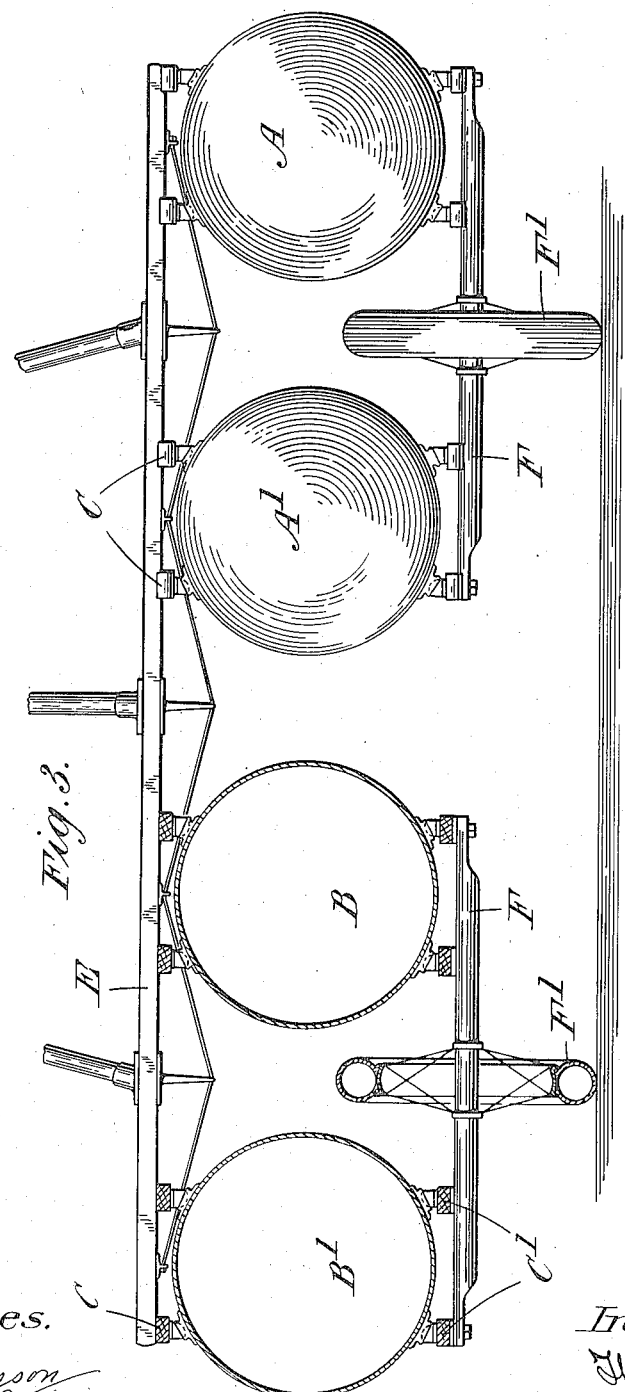

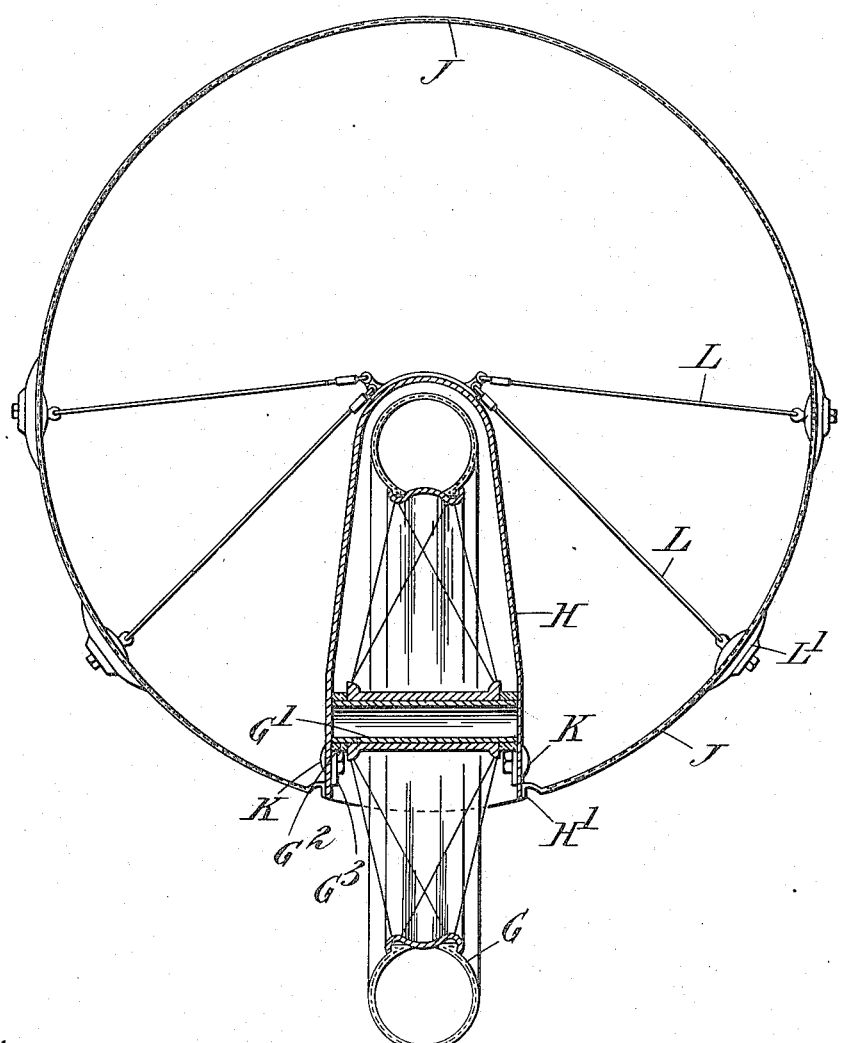

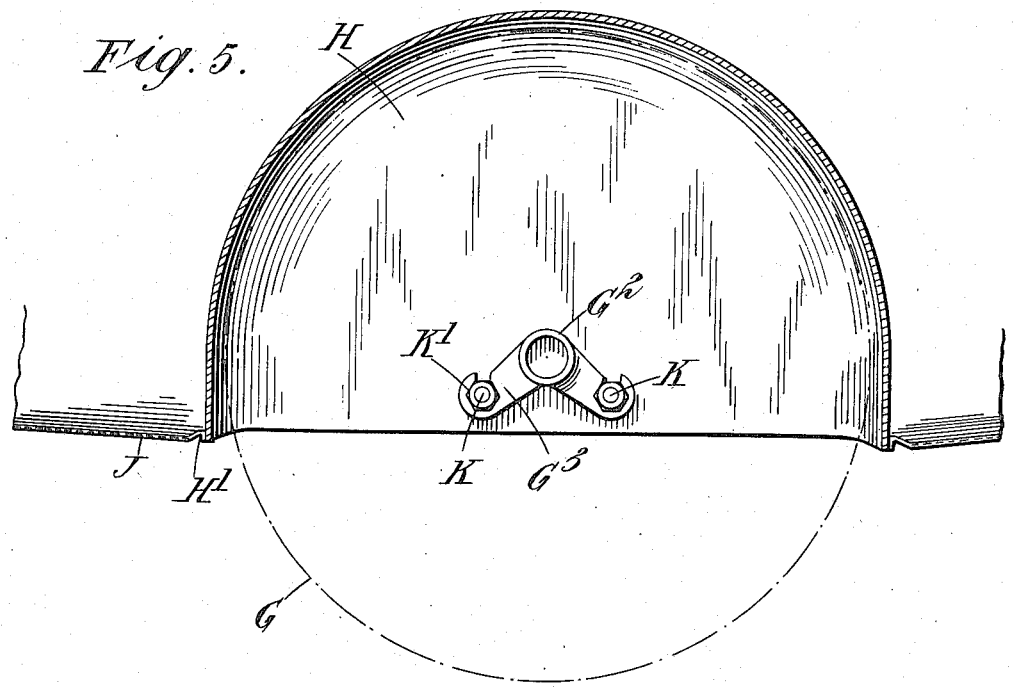

THOMAS SLOPER, OF DEVIZES, ENGLAND.

HYDROAEROPLANE.

1,148,340.  Specification of Letters Patent.  Patented July 27, 1915.

Application filed July 14, 1914. Serial No. 851,017.

*To all whom it may concern:*

Be it known that I, THOMAS SLOPER, a subject of the King of England, residing at Devizes, in Wiltshire, England, have invented certain new and useful Improvements in Hydroaeroplanes, of which the following is a specification.

As is well-known hydro-aeroplanes are sometimes provided with wheels for landing purposes and these have heretofore been supported from the frame of the hydro-aeroplane independently of the floats, some resilient means being introduced to take up shock between the wheels and the frame, or the wheels have been carried in recesses in rigid floats.

According to the present invention, a float is employed which is made to keep its shape by gas under pressure within the float and one or more wheels are combined therewith carried by a part which is connected to the frame of the machine through the float in such manner that the latter serves as a cushion between the frame and such member. It will be appreciated that a rigid float would not thus act as a cushion even though the wheels were carried on it. Flexible inflated floats, that is, floats made to keep their shape by a gas under pressure are known, but not as used to carry the wheels for landing. The member carrying the wheel may be supported by two or more of the inflated floats, and the wheel may be mounted in such position that part of it projects into a space provided between two float chambers side by side, or the float may be provided with a cavity in its under-side and the member carrying the wheel may be mounted within this cavity.

In the accompanying drawings:—Figure 1 is a side elevation of a double float and wheel according to one method of carrying out this invention; Fig. 2 is a plan of the same; Fig. 3 is a front view of two double floats secured to the frame of a hydro-aeroplane, one of the floats and its wheel being shown in section; Fig. 4 is a section through a float provided with a cavity having a wheel mounted therein, and Fig. 5 is a section through the cavity in the plane of the wheel.

The same letters indicate the same parts throughout the drawings.

The double floats comprise two elongated float-chambers A, A¹, or B, B¹, which may be made of flexible material, rubberized or vulcanized and secured together in sections, and is made to maintain its shape by being filled with gas under pressure.

On the upper side of each float-chamber longitudinal members C of wood or other material are secured in any convenient manner. Fastened to the longitudinal members C are transverse frame-members E, which constitute part of the main framework of the hydro-aeroplane and brace together two double floats, as shown in Fig. 3, the members extending over the four chambers and being secured to the longitudinal members C on each. Each float-chamber has on its under-side other longitudinal members C¹ and the chambers constituting one double float are braced together by a lower transverse member F which has mounted upon it a wheel F¹. The wheel is conveniently mounted at the middle of this member, so that its upper half lies between the two members A, A¹ which are spaced apart sufficiently for this purpose. Obviously the transverse member F may be extended as one across the whole of the four chambers if desired, but more yield is afforded by dividing it in the manner shown in Fig. 3 and providing one wheel on each portion.

It will be seen that when either or both of the wheels F¹ strike the ground, the impact is transmitted from the wheel to the transverse member F and thence to the float-chambers which thus act as a cushion between the wheel and the main frame-members E of the hydro-aeroplane. In this way the shock is absorbed and the float is made to serve the double purpose of a float and a cushioning device for the wheels, whereby cushioning devices for the wheels auxiliary to the floats can be dispensed with.

In the arrangement shown in Figs. 4 and 5, the landing wheel G is mounted within a cavity formed by a hood H mounted in the float. With this construction it is not necessary to employ double floats, but a single float on each side of the machine can be used, each having in it a wheel G. The hood H may be formed of sheet metal and is connected to the wall J by means of a fluid tight joint, such as shown at H¹. The wheel is carried by a tubular axle G¹ mounted in sockets G² having slotted arms or ear-pieces G³.

When assembling the parts, the wheel with the axle and sockets all in place are slid up into the hood and the slots of the arms $G^3$ are brought opposite bolts K secured to the hood H. These bolts are provided with nuts $K^1$ which lie on that side of the arms $G^3$ remote from the inner face of the hood H, so that when these are screwed home they grip the arms against the hood H and thereby hold the wheel in place. If it is desired to stay the hood H, this may be done by tie-wires L which extend from the upper portion of the hood to anchoring devices $L^1$ which extend through the wall of the fabric to receive the ties L.

It will be seen that a wheel mounted in the float in this manner offers little wind resistance and the air-pressure within the float tends to keep it in position against undue lateral displacement, although this may be supplemented by the ties L as already explained. The resilience of the float is moreover still retained as the float constitutes a cushioning member between the supporting-axle for the wheel and the frame of the hydro-aeroplane which would be secured to the upper side of the float as already described with reference to Figs. 1–3.

Obviously the hold H may be secured by ties extending to any part of the float and in addition to these ties serving to hold the hood in position, they may also serve to hold in any part of the float which tends to be distorted.

What I claim as my invention and desire to secure by Letters Patent is:—

1. For a hydro-aeroplane the combination of, a float made of flexible material and constructed to keep its shape by being filled with gas under pressure, a landing-wheel for the float, and means supporting the wheel from the float in such manner that the float serves as a cushion between the wheel and the part of the hydro-aeroplane supported by the float, substantially as set forth.

2. For a hydro-aeroplane the combination of, a float made of flexible material and constructed to keep its shape by being filled with gas under pressure, means for attaching the frame of the hydro-aeroplane to the upper side of the float, a landing-wheel for the float, and means for supporting the landing-wheel from the under-side of the float so that the float serves as a cushion between the wheel and the frame of the hydro-aeroplane, substantially as set forth.

3. For a hydro-aeroplane the combination of, a float made of flexible material constructed to keep its shape by being filled with gas under pressure, means for securing the frame of the hydro-aeroplane to the upper side of the float, a landing-wheel for the float, and a bearing-member for the landing-wheel supported from the under-side of the float in such position that the upper part of the wheel lies above the said under-side of the float, the arrangement being such that the wheel does not foul the float but the float serves as a cushion between the bearing-member of the wheel and the frame of the hydro-aeroplane, substantially as set forth.

4. For a hydro-aeroplane the combination of, a float made of flexible material and constructed to keep its shape by being filled with gas under pressure, means for attaching the frame of the hydro-aeroplane to the upper side of the float, a landing-wheel for the float, a bearing-member for the wheel, and a support for the bearing-member secured to the under-side of the float, the float being provided with a cavity above the support to receive the upper part of the wheel, substantially as set forth.

5. For a hydro-aeroplane the combination of, a float made of flexible material and constructed to keep its shape by being filled with gas under pressure, a landing-wheel for the float, a rigid hood secured within the float with its mouth opening downward through the bottom of the float, and means for securing a bearing-member for the landing-wheel to the hood, substantially as set forth.

6. For a hydro-aeroplane the combination of, a float made of flexible material and constructed to keep its shape by being filled with gas under pressure, a landing wheel for the float, a rigid hood secured within the float with its mouth opening downward through the bottom of the float, means for securing a bearing-member for the landing-wheel to the hood, and internal ties securing the upper end of the hood to the float, substantially as set forth.

7. For a hydro-aeroplane the combination of, a float made of flexible material and constructed to keep its shape by being filled with gas under pressure, means for securing the upper part of the float to the frame of the hydro-aeroplane to support the latter, a hood secured within the float with its mouth opening downward through the bottom of the float, a landing-wheel for the float rotatably mounted on an axle, arms one on each end of the axle and made with the axle to slide into the hood, and clamping means carried by the walls of the hood to secure the arms thereto, substantially as set forth.

8. For a hydro-aeroplane the combination of a float made of flexible material and constructed to keep its shape by being filled with gas under pressure, means for securing the upper part of the float to the frame of the hydro-aeroplane to support the latter, a hood secured within the float with its mouth opening downward through the bottom of the float, a landing-wheel for the float rotatably mounted on an axle, arms one on each end of the axle and made with the axle to slide into the hood, and bolts and nuts carried two on each side of the hood and so positioned as to engage slots in the arms on the axle so that these can be slid into place about the bolts and then held by screwing home the movable members of the bolts and nuts, substantially as set forth.

In testimony whereof I have signed my name to this specification in the presence of two subscribing witnesses.

THOMAS SLOPER.

Witnesses:
 HAROLD PARSONS,
 JAMES ARBEN.